United States Patent
Simske et al.

(10) Patent No.: US 8,614,836 B2
(45) Date of Patent: Dec. 24, 2013

(54) ENHANCED SECURITY PRINTING OF A LAYOUT TEMPLATE

(75) Inventors: Steven J. Simske, Fort Collins, CO (US); Malgorzata M. Sturgill, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

(21) Appl. No.: 13/125,280

(22) PCT Filed: Oct. 20, 2008

(86) PCT No.: PCT/US2008/080535
§ 371 (c)(1),
(2), (4) Date: Apr. 20, 2011

(87) PCT Pub. No.: WO2010/047686
PCT Pub. Date: Apr. 29, 2010

(65) Prior Publication Data
US 2011/0194152 A1     Aug. 11, 2011

(51) Int. Cl.
*G06K 15/02* (2006.01)

(52) U.S. Cl.
USPC ........................................................ 358/3.28

(58) Field of Classification Search
USPC ........................................................ 358/3.28
See application file for complete search history.

(56) References Cited

U.S. PATENT DOCUMENTS

| 4,782,221 A | 11/1988 | Brass |
| 2007/0045428 A1 | 3/2007 | Walmsley |
| 2008/0099565 A1 | 5/2008 | Simske |
| 2008/0159588 A1 | 7/2008 | Rhoads |
| 2008/0181447 A1 | 7/2008 | Adams et al. |
| 2008/0181451 A1 | 7/2008 | Simske |

FOREIGN PATENT DOCUMENTS

| CN | 101146168 A | 3/2008 |
| WO | WO2004/051917 | 6/2004 |

OTHER PUBLICATIONS

PCT/US2008/080535; international Search Report and the Writen Opinion; Incl 4 Cited Refs.

*Primary Examiner* — Charlotte M Baker

(57) ABSTRACT

A method for enhancing security printing of a layout template is disclosed. The method includes receiving the layout template, and acknowledging one or more constraints for the layout template. At least one unconstrained layout element of the layout template is varied, thereby generating a varied layout template. The varied layout template is printed and scanned. The method further includes determining a number of bits that can be encoded in the varied layout template, where the number of bits depends on the varying of the at least one unconstrained layout element.

15 Claims, 2 Drawing Sheets

ENHANCED SECURITY PRINTING OF A LAYOUT TEMPLATE

BACKGROUND

The present disclosure relates generally to enhanced security printing of a layout template.

Product labeling and security packaging are important components of brand protection, product tracking and authenticating, as well as of anti-counterfeiting initiatives. Product labeling and security packaging involve providing each package with a unique ID, in the form of, for example, a deterrent or mark. Such deterrents/marks may be overt and/or covert, and contain authenticable data. Such deterrents enable the product to be identified and tracked, and the product inventory to be maintained. Furthermore, measures are often taken to enhance the probability that the product cannot be counterfeited, for example, by making the packaging or labels difficult and/or time consuming to replicate and/or by using variable data printing (VDP).

Security deterrents often compete with branding, sales and other product information for printed real estate. As such, it may be advantageous for the deterrent to simultaneously provide multiple levels of protection and functionality, or for the deterrence to be integrated into the printing process in such a way that the branding and/or product information contains authenticable data that is hidden in plain sight.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiments of the method(s) disclosed herein advantageously adapt the package printing layout for use in security/steganography. The enhanced security of the printed layout may be particularly useful in product inspection, recall, warranty fraud prevention, and/or authentication. In the method disclosed herein, certain layout parameters are varied without deleteriously affecting the brand identification, brand differentiation, product identification, product safety, or other intentions of the printing. The physical layout of a label, document, or the like is used to add security information. As such, data is added through a means not associated with the printed elements themselves, but rather through the relative position of these elements. The varied layout template that is deployed provides a first line of defense against counterfeiters, while the data encoded therein provides a second line of defense against counterfeiters.

Figure 1:
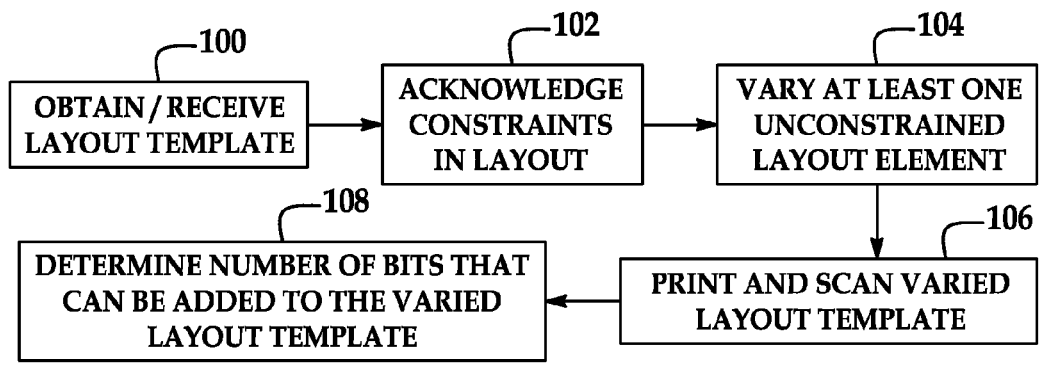
FIG. 1 is a flow diagram depicting an embodiment of a method for enhancing security printing of a layout template.

Referring now to FIG. 1, an embodiment of the method for enhancing security printing is depicted. It is to be understood that FIGS. 2A and 2B will also be referenced throughout the description of FIG. 1.

The method generally begins when a layout template for a printed region on an object is received by a person or entity (i.e., a security printer) that adds security information to the layout template, as shown at reference numeral 100. The generator and/or supplier of the layout template may be the person or entity that owns the object that is to be branded, labeled and/or packaged with the layout, or a label converter hired by the object owner. Once generated, the layout template is sent to the security printer for the addition of security information. This security information is generally implemented into the layout template prior to final branding, labeling and/or packaging of the object (shown as 1000 in FIG. 2B and described further hereinbelow).

Figure 2A:
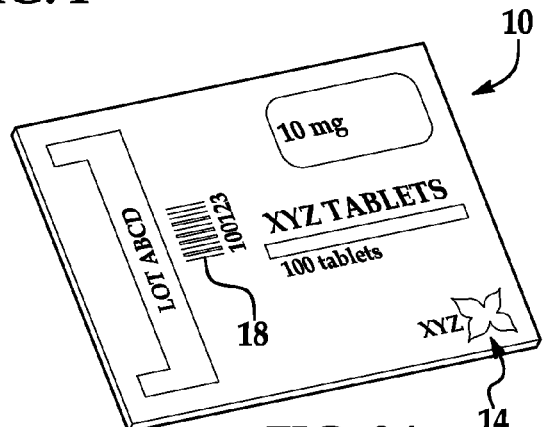
FIGS. 2A and 2B schematically depict embodiments of the layout template as received (FIG. 2A) and the layout template after variation (FIG. 2B)

A non-limiting example of a layout template 10 is shown in FIG. 2A. The layout template 10 generally includes branding information and any other information that is desirable to describe the product associated therewith. The layout template 10 may include the product name and description, and if applicable, any dosage information, concentration or strength information, expiration information, potential side effects, total count, lot number, and/or other like information. The layout template 10 may also include bar codes and/or other deterrents for product authentication. In addition to specifying the desirable size, shape, color(s), location/position and/or or font of the elements for the final printed region 12, the original layout template 10 also specifies desirable variable copy holes for the printed region 12 (shown in FIG. 2B).

Some elements of the layout template 10 are constrained layout elements (i.e., those aspects of the elements' layouts that cannot be varied, e.g., the location of one side for alignment), and other aspects of the layout template 10 are unconstrained layout elements (i.e., those elements that can be varied). Generally, the constraints for layout variation are determined by the person/entity that generates the original layout template 10, and may not be altered by the security printer. Such constraints may be based upon aesthetic considerations, branding information concerns, product information concerns, the hardware of a printer to be used to print the printed region 12, at least one of hardware or software of a device to be used to read the printed region 12, or combinations thereof. As one example, if the product logo has a particular design or is a trademark (e.g., see the element depicted at reference numeral 14 in FIGS. 2A and 2B), then this particular element of the layout template 10 is a constrained layout element. As another example, if modifications to copy holes would preclude accurate measurement or other variations in the layout, then these particular copy holes are constrained layout elements and may not be varied (e.g., if the element in the copy hole is used as an anchor or fiducial mark for other elements outside the copy hole, then the relative location of the data within the copy hole should not be moved). As still another example, the locations of the box containing the lot ID and the strength may be constrained layout elements. It is to be understood, however, that the constraints (and thus the constrained layout elements) may vary among different layout templates 10.

Referring back to FIG. 1, after the layout template 10 is received, the security printer acknowledges the constraint(s) of the layout template 10, as shown at reference numeral 102. As previously mentioned, such constraints may be set by the person/entity that generates the original layout template 10. The particular constraints may be transmitted to the security printer with the layout template 10, or may be identified at some point after the layout template 10 is received.

After the constraints for a particular layout template 10 are recognized, the security printer varies one or more of the unconstrained layout elements (as shown at reference numeral 104) in order to provide additional real estate for the addition of security information. By varying one or more of the unconstrained layout elements, the security printer generates a varied layout template 10', shown in FIG. 2B. Varying the unconstrained layout element(s) involves changing one or more of x-positional spacing, y-positional spacing, background centering, size, scaling, relative colors, absolute colors, color differences, density, intensity, or rotation of the unconstrained layout element(s). Such variation may create additional bits for encoding data in the layout itself and/or may generate variable holes for incorporating explicit security deterrents 16 (shown in FIG. 2B and described further in reference to FIG. 3), which may also encode data.

Figure 2B:
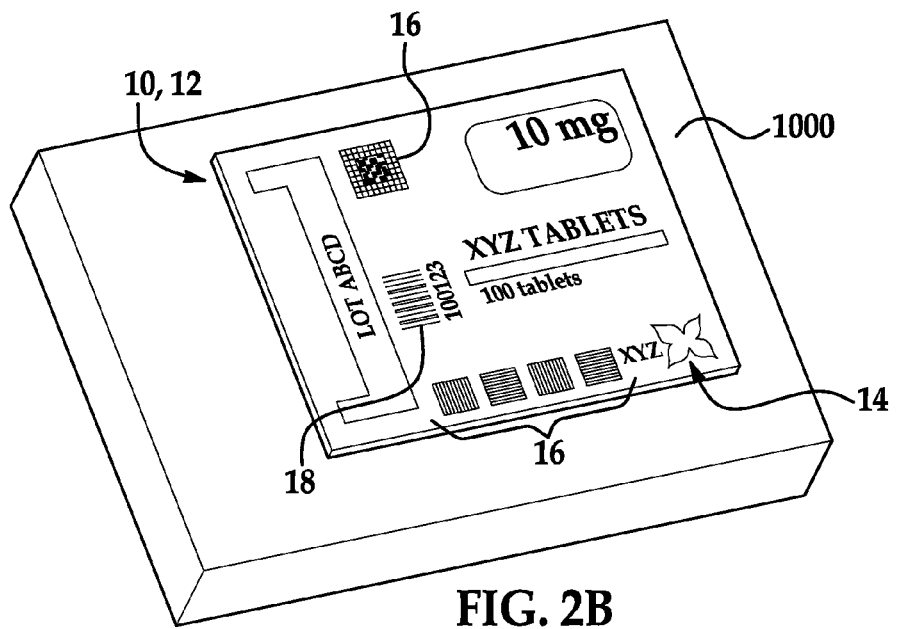

In the example shown in FIGS. 2A and 2B, the "10 mg" image is moved (in the varied layout template 10') in the x- and y-directions and is scaled, for example, by less than 5%, without changing the visual appeal of the original layout template 10. As another non-limiting example, the line separating "XYZ TABLETS" from "100 tablets" could also be repositioned so that the two lines of text are above or below the line. Still further, while the size of the 2D bar code 18 may be a constraint, it may be acceptable to alter its position within the layout template 10.

When altering the desired unconstrained layout element(s), the largest region of the layout template 10 or an explicit fiducial may be used as an anchor, and then the unconstrained layout element(s) may be varied as desired. In an embodiment, there is one anchor point, or fiducial mark, for the relative displacements. If the location of this fiducial is considered fixed, then all the other shifts are measured with respect to their x and y distances from the fixed mark, or anchor/fiducial.

It is to be understood that one unconstrained layout element may be varied, or a plurality of unconstrained layout elements may be varied. Such variation may depend, at least in part, on the number of unconstrained layout elements available, and the required or desired security information to be incorporated into the layout template 10. Furthermore, one or more possible varied layout templates 10' may be generated. For example, if the original layout template 10 includes two unconstrained layout elements, three possible varied layout templates 10' include one in which one of the two elements is altered, one in which the other of the two elements is altered, or one in which both of the elements are altered.

Once the unconstrained layout element(s) is/are varied, the varied layout template(s) 10' is printed and scanned, as shown at reference numeral 106 in FIG. 1. It is to be understood that if more than one varied layout template 10' is generated, each allowable variation may be printed and scanned in order to determine which configuration will accommodate the desired or required data.

The scanned varied layout template 10' enables the security printer, using, for example, a segmentation or machine vision based system, to determine a number of bits that can be added to the varied layout template 10'. As such, the variance may be quantified from a scanned image of the printed varied layout template 10'. As a non-limiting example, if the relative offset of the "10 mg" is varied from 30 pixels to 60 pixels right of the left edge of the box it is contained in, and the system used can distinguish differences of 2 pixels or more, then data may be encoded as 30, 32, 34 . . . 60 pixels from the left edge of the box. This enables 16 different possible locations, which is 4 bits of information. This sensitivity analysis is performed for each of the varied layout templates 10' that is generated, printed, and scanned. It is to be understood that different varied layout templates 10' may accommodate different numbers of bits.

While not shown in FIG. 1, the security printer may then transmit one or more deployment recommendations to the supplier of the original layout template 10. The deployment recommendation may include a single varied layout template 10', or multiple varied layout templates 10'. Generally, the security printer transmits to the supplier the varied layout template(s) 10' that, without further modification, will accommodate a desired or required security bit stream. For example, if the relative location of "10 mg" as described above is encoded as 0000 when at 30, 0001 when at 32 . . . , 1111 when at 60, then if the security bit stream (to be mass serialized, etc.) corresponding to the varied layout template 10' is 0101, the recommendation would include placing "10 mg" at 40 pixels from the left boundary of the box.

In some instances, however, the security printer may transmit multiple varied layout templates 10' along with one or more suggestions as to which combinations will accommodate the desired or required security bit stream. Referring again to the example shown in FIGS. 2A and 2B, if both the position and scaling of the "10 mg" indicia and the position of the 2D bar code 18 will accommodate the desired or required security bit stream, varied layout templates 10' illustrating all possible variations (i.e., movement and scaling of 10 mg alone, movement of bar code 18 alone, and combining the two variations) may be sent to the supplier with a suggestion as to: i) which variations would accommodate the security bit stream without additional explicit security deterrents 16; and ii) which variations would require additional explicit security deterrents 16. As will be described further hereinbelow in reference to FIG. 3, if a surfeit of bits of the required security bit stream can be accommodated by the varied layout 10', explicit deterrents 16 may be omitted. However, if the surfeit of bits of the required security bit stream cannot be accommodated by the varied layout 10', explicit security deterrents 16 may be added.

After determining which varied template layout 10' or combination thereof is suitable, the supplier informs the security printer of such selection. This varied layout template 10' will then be used to generate the printed region 12 on each object 1000 (shown in FIG. 2B). It is to be understood that in other instances, the security printer may determine, without assistance or verification from the supplier, which varied layout template 10' will be utilized to generate the printed region 12.

Once the varied layout template 10' is selected, the number of bits that can be accommodated by such template 10' is encoded therein. It is to be understood that such bits may be encrypted or scrambled prior to such encoding. The encoded data is often one or more payloads (e.g., any number of bits that make up part of a tacit (published) deterrent) of the template 10' and thus of the printed region 12. As a non-limiting example, if 160 bits are in the layout variability, 38 bits may be designated for the variable bits in a 96-bit SGTIN EPC global identifier replicated in the bar code 18, and another 122 bits are left over for other payloads, such as, for example, password(s), product code(s), etc. It is to be understood that any desirable scrambling, encryption or encoding scheme may be used in the embodiments disclosed herein.

The encoded varied layout template 10' may then be printed on the object 1000 to form the printed region 12. Printing may be accomplished by any suitable printing technique, including inkjet printing, dry electrophotography, liquid electrophotography, or other variable data printing techniques.

It is to be understood that the term "object" as used herein is to be interpreted broadly and may include, but is not limited to any type of object, product, document or package. Likewise, the term "package" is to be interpreted broadly herein to include any unit for containing a product, displaying a product, or otherwise identifying a branded good. Non-limiting examples of such packages include labels, anti-tamper strips (which tear when removal is attempted, thereby damaging both visual and electrical aspects of any deterrents), boxes, bags, containers, clamshells, bands, tape, wraps, ties, bottles, vials, dispensers, inserts, other documents, or the like, or combinations thereof.

Figure 3:
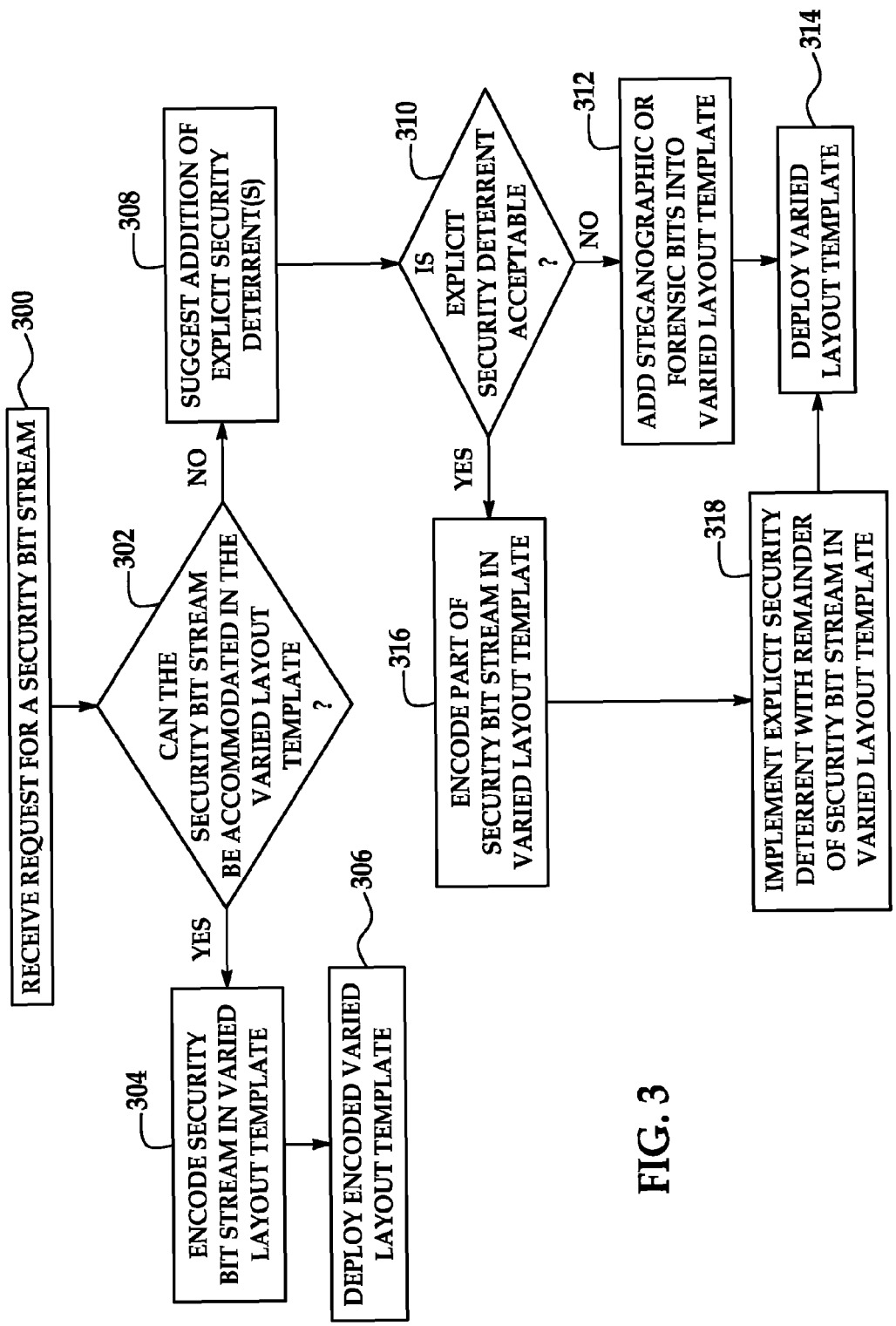
FIG. 3 is a flow diagram depicting additional steps of the method after a varied layout template is generated.

Referring now to FIG. 3, additional steps of the method may be required prior to encoding the varied layout template 10'. As shown at reference numeral 300, a request for implementing a particular security bit stream into the printed region 12 may be received by the security printer. This request may be received from the product owner, or it may be generated internally at the security printer.

When a particular security bit stream is required to be encoded, the security printer will determine whether the required bit stream can be accommodated by the varied layout template 10', as shown at reference numeral 302. Such a determination may be made by subtracting the number of bits that can be encoded in the varied layout template 10' from the required security bit stream. If this calculation results in a number less than or equal to 0 bits, then the varied layout template 10' can accommodate the entire security bit stream. The method then includes encoding the bit stream in the varied layout template 10' (reference numeral 304) and deploying the encoded varied layout template 10' as the printed region 12 on the object 1000 (reference numeral 306).

However, if the calculation results in a number that is greater than 0 bits, then the varied layout template 10' can accommodate only a portion of the entire security bit stream. In order to ensure that the entire required security bit stream is deployed in the printed region 12, the security printer may suggest adding one or more explicit security deterrents 16 (shown in FIG. 2B) that are independent of the varied layout template 10' to the varied layout template 10', as shown at reference numeral 308. It is to be understood that the addition of one or more security deterrents 16 may, in some instances, require further repositioning of the unconstrained elements of varied layout template 10.

The security deterrent(s) 16 that is/are suggested will generally be suitable for encoding the remaining bits of the required security bit stream. Non-limiting examples of such security deterrents 16 include color lines, fingerprints, color text, copy detection patterns (CDP), color tiles, letter sequences, number sequences, graphic sequences, target patterns, bar codes, guilloche patterns, planchettes, holographs, anti-tamper deterrents, or other relevant deterrents known to those skilled in the art, or combinations thereof.

Since explicit security deterrents 16 would alter the appearance of the varied layout template 10' even further, the addition of one or more deterrents 16 may be unacceptable to the supplier of the original layout template 10. As such, the security printer may inquire as to whether the addition of one or more deterrents 16 to the varied layout template 10' is acceptable, as shown at reference numeral 310.

If the supplier of the original layout template 10 indicates that the suggested explicit security deterrent(s) 16 is/are unacceptable, then the security printer may add steganographic bits or forensic bits into the varied layout template 10'. Non-limiting examples of steganographic bits include digital watermarks, altered characters/spacing, UV, IR or other invisible ink marks, or the like. Non-limiting examples of forensic bits include chemical bits, nano-bits, or fiducial-mark based bits. It is to be understood that steganographic or forensic bits may be more desirable as they do not further visually alter the appearance of the varied layout template 10'. Once the entire security data stream is encoded into the varied layout template 10', it may be deployed as the printed region 12, as shown at reference numeral 314.

If the supplier of the original layout template 10 indicates that the suggested explicit security deterrent(s) 16 is/are acceptable for addition to the varied layout template 10', the portion of the security bit stream that fits into the varied layout template 10' (without the explicit security deterrent(s) 16) is encoded therein, as shown at reference numeral 316. The explicit security deterrent(s) 16 is/are then implemented into the varied layout template 10'. Such explicit security deterrent(s) 16 have the remainder of the security bit stream encoded therein, as shown at reference numeral 318. As a non-limiting example, if the varied layout template 10' of FIG. 2B (without the security deterrents 16) can accommodate 48 bits with brand owner acceptance and the required security bit stream has 320 bits, then the additional security deterrents 16 will be configured to accommodate the remaining 272 bits. This creates a relationship between the final layout and the deterrent 16 features, which may increase the difficulty of successfully counterfeiting the printed region 12.

As previously mentioned, any suitable encoding scheme may be utilized, and such data may be scrambled or encrypted prior to being encoded. The varied template layout 10', in this embodiment including explicit security deterrent(s) 16, is deployed as the printed region 12.

When explicit security deterrents 16 are added to the varied layout template 10', it is to be understood that these deterrents 16 may be considered unconstrained layout elements. In other words, a traditional deterrent 16 can provide additional layout bits based on its location, size, etc. (in addition to its content, or payload). As such, these deterrents 16 may also be varied within the layout template 10' as long as the branding message is not offended, such deterrents 16 remain readable, and visual dissonance is not created.

As previously mentioned, FIG. 2B illustrates one example of a varied layout template 10' that is deployed as the printed region 12 on the object 1000. This particular varied layout template 10' (and printed region 12) includes unconstrained elements that have been varied (e.g., the "10 mg" indicia and the position of the 2D bar code), constrained elements that have not been varied (e.g., the logo 14), and additional security deterrents 16. The constrained and unconstrained elements shown in FIG. 2B are illustrative examples, and it is to be understood that many other variations of the varied layout template 10' may be implemented.

The embodiments of the method disclosed advantageously ease the object 1000 inspection process. An inspector who is made privy to the changes to the original layout template 10 (as deployed in the printed region 12), can easily see or verify the differences and verify that the differences correspond to those that were authorized prior to deployment. Such visual inspections may be particularly useful for field inspectors and/or when low quality, poor contrast, or low resolution devices are used for authentication. As a non-limiting example, an inspector who is privy to the fact that a printed region 12 of a particular product 1000 includes a shift down in one line accompanied by a left shift of the "10 mg" indicia can readily authenticate the product 1000. Since any constraints may be imposed into the variable layout, inspection of the varying layout images may be easier. Furthermore, the tacit relationship between the layout changes may be useful to inspectors without adding additional bits to the layout-based security payload.

Clause 1: A method for enhancing security printing of a layout template, comprising:
  receiving the layout template;
  acknowledging one or more constraints for the layout template;
  varying at least one unconstrained layout element of the layout template, thereby generating a varied layout template;
  printing and scanning the varied layout template; and
  determining a number of bits that can be encoded in the varied layout template, the number of bits depending on the varying of the at least one unconstrained layout element.

Clause 2: The method as defined in clause 1 wherein a plurality of unconstrained layout elements are available in the layout template, and wherein the method further comprises:
  varying at least one of x-positional spacing, y-positional spacing, background centering, size, scaling, relative colors, absolute colors, color differences, density, intensity, or rotation of at least two of the plurality of unconstrained layout elements, thereby generating a plurality of varied layout templates;
  printing and scanning each of the varied layout templates; and
  determining a total number of bits that can be encoded into each of the varied layout templates.

Clause 3: The method as defined in clause 2, further comprising:
  transmitting each of the varied layout templates to a supplier of the layout template;
  receiving, from the supplier, a selected combination of the varied layout templates to be deployed as a final layout template; and
  encoding a total number of bits that corresponds to the selected combination of the varied layout templates into the final layout template.

Clause 4: The method as defined in any of the preceding clauses wherein the one or more constraints are based upon aesthetic considerations, branding information concerns, product information concerns, hardware of a printer used to print the varied layout template, at least one of hardware or software of a device used to read the varied layout template, or combinations thereof.

Clause 5: The method as defined in any of the preceding clauses, further comprising:
  transmitting a deployment recommendation including the varied layout template to a supplier of the layout template; and
  receiving verification from the supplier that the deployment recommendation is acceptable.

Clause 6: The method as defined in any of the preceding clauses, further comprising encoding the number of bits in the varied layout template.

Clause 7: The method as defined in clause 6, further comprising encrypting or scrambling the bits prior to encoding.

Clause 8: The method as defined in any of the preceding clauses, further comprising:
  determining whether a required security bit stream can be accommodated in the varied layout template by:
    subtracting the number of bits that can be encoded in the varied layout template from the required security bit stream to determine a remaining number of bits; and
    ensuring that the remaining number of bits can be accommodated by explicit security deterrents incorporated into the varied layout template.

Clause 9: The method as defined in any of the preceding clauses, further comprising:
  receiving a request for incorporating a security bit stream into the varied layout template;
  determining whether the requested security bit stream can be accommodated in the varied layout template; and
    i) if the requested security bit stream can be accommodated in the varied layout template, then:
      encoding the requested security bit stream in the varied layout template; and
      deploying the varied layout template with the requested security bit stream encoded therein; or
    ii) if the requested security bit stream cannot be accommodated in the varied layout template, then:
      suggesting addition of at least one explicit security deterrent that is independent of the varied layout template;
      determining if the addition of the at least one explicit security deterrent is acceptable; and
      when the addition of the at least one explicit security deterrent is acceptable, the method further includes:
        encoding the number of bits in the varied layout template; and
        implementing the at least one explicit security deterrent, containing a remainder of the bits of the requested security bit stream, in the varied layout template.

Clause 10: The method as defined in clause 9 wherein when the requested security bit stream cannot be accommodated in the varied layout template and the addition of the at least one explicit security deterrent is not acceptable, the method further comprises adding at least one of steganographic bits or forensic bits into the varied layout template.

Clause 11: The method as defined in clause 10 wherein the steganographic bits are selected from digital watermarks, altered characters, altered spacing, or invisible ink marks, or wherein the forensic bits are selected from chemical bits, nano bits or fiducial-mark based bits.

Clause 12: The method as defined in any of the preceding clauses wherein varying the at least one unconstrained layout element is accomplished by changing at least one of x-positional spacing, y-positional spacing, background centering, size, scaling, relative colors, absolute colors, color differences, density, intensity, or rotation of the at least one unconstrained layout element.

Clause 13: An object, comprising:
  a printed region established thereon, the printed region based on a varied layout template including:
    at least one constrained layout element; and
    at least one unconstrained layout element having at least one of an original x-positional spacing, an original y-positional spacing, an original background centering, an original absolute color, a color difference, an original size, an original scaling, an original density, an original intensity, or an original rotation varied; and
  a security bit stream, at least a portion of which is encoded in the at least one unconstrained layout element.

Clause 14: The object as defined in clause 13, further comprising an explicit security deterrent incorporated into the varied layout template and the printed region.

Clause 15: The object as defined in any of clauses 13 or 14 wherein at least an other portion of the security bit stream is encoded in the explicit security deterrent.

While several embodiments have been described in detail, it will be apparent to those skilled in the art that the disclosed embodiments may be modified. Therefore, the foregoing description is to be considered exemplary rather than limiting.

What is claimed is:
1. A method for enhancing security printing of a layout template, comprising:
  receiving the layout template;
  acknowledging one or more constraints for the layout template;

varying at least one unconstrained layout element of the layout template, thereby generating a varied layout template;

printing and scanning the varied layout template; and determining a number of bits that can be encoded in the varied layout template, the number of bits depending on the varying of the at least one unconstrained layout element.

2. The method as defined in claim 1 wherein a plurality of unconstrained layout elements are available in the layout template, and wherein the method further comprises:

varying at least one of x-positional spacing, y-positional spacing, background centering, size, scaling, relative colors, absolute colors, color differences, density, intensity, or rotation of at least two of the plurality of unconstrained layout elements, thereby generating a plurality of varied layout templates;

printing and scanning each of the varied layout templates; and determining a total number of bits that can be encoded into each of the varied layout templates.

3. The method as defined in claim 2, further comprising:

transmitting each of the varied layout templates to a supplier of the layout template;

receiving, from the supplier, a selected combination of the varied layout templates to be deployed as a final layout template; and encoding a total number of bits that corresponds to the selected combination of the varied layout templates into the final layout template.

4. The method as defined in claim 1 wherein the one or more constraints are based upon aesthetic considerations, branding information concerns, product information concerns, hardware of a printer used to print the varied layout template, at least one of hardware or software of a device used to read the varied layout template, or combinations thereof.

5. The method as defined in claim 1, further comprising:

transmitting a deployment recommendation including the varied layout template to a supplier of the layout template; and receiving verification from the supplier that the deployment recommendation is acceptable.

6. The method as defined in claim 1, further comprising encoding the number of bits in the varied layout template.

7. The method as defined in claim 6, further comprising encrypting or scrambling the bits prior to encoding.

8. The method as defined in claim 1, further comprising:

determining whether a required security bit stream can be accommodated in the varied layout template by:

subtracting the number of bits that can be encoded in the varied layout template from the required security bit stream to determine a remaining number of bits; and ensuring that the remaining number of bits can be accommodated by explicit security deterrents incorporated into the varied layout template.

9. The method as defined in claim 1, further comprising:

receiving a request for incorporating a security bit stream into the varied layout template;

determining whether the requested security bit stream can be accommodated in the varied layout template; and i) if the requested security bit stream can be accommodated in the varied layout template, then:

encoding the requested security bit stream in the varied layout template; and deploying the varied layout template with the requested security bit stream encoded therein; or ii) if the requested security bit stream cannot be accommodated in the varied layout template, then:

suggesting addition of at least one explicit security deterrent that is independent of the varied layout template;

determining if the addition of the at least one explicit security deterrent is acceptable; and when the addition of the at least one explicit security deterrent is acceptable, the method further includes:

encoding the number of bits in the varied layout template; and implementing the at least one explicit security deterrent, containing a remainder of the bits of the requested security bit stream, in the varied layout template.

10. The method as defined in claim 9 wherein when the requested security bit stream cannot be accommodated in the varied layout template and the addition of the at least one explicit security deterrent is not acceptable, the method further comprises adding at least one of steganographic bits or forensic bits into the varied layout template.

11. The method as defined in claim 10 wherein the steganographic bits are selected from digital watermarks, altered characters, altered spacing, or invisible ink marks, or wherein the forensic bits are selected from chemical bits, nano bits or fiducial-mark based bits.

12. The method as defined in claim 1 wherein varying the at least one unconstrained layout element is accomplished by changing at least one of x-positional spacing, y-positional spacing, background centering, size, scaling, relative colors, absolute colors, color differences, density, intensity, or rotation of the at least one unconstrained layout element.

13. An object, comprising:

a printed region established thereon, the printed region based on a varied layout template including:

at least one constrained layout element; and at least one unconstrained layout element having at least one of an original x-positional spacing, an original y-positional spacing, an original background centering, an original absolute color, a color difference, an original size, an original scaling, an original density, an original intensity, or an original rotation varied; and a security bit stream, at least a portion of which is encoded in the at least one unconstrained layout element.

14. The object as defined in claim 13, further comprising an explicit security deterrent incorporated into the varied layout template and the printed region, wherein at least an other portion of the security bit stream is encoded in the explicit security deterrent.

15. A security print job, comprising:

a varied layout template including:

at least one constrained layout element; and at least one unconstrained layout element having at least one of an original x-positional spacing, an original y-positional spacing, an original background centering, an original absolute color, a color difference, an original size, an original scaling, an original density, an original intensity, or an original rotation varied; and a security bit stream, at least a portion of which is encoded in the at least one unconstrained layout element.

* * * * *